March 29, 1938. J. BRAND 2,112,266
ELASTIC PIPE CONNECTION FOR LOW TENSION WORKING PRESSURE OR VACUUM
Filed April 17, 1936
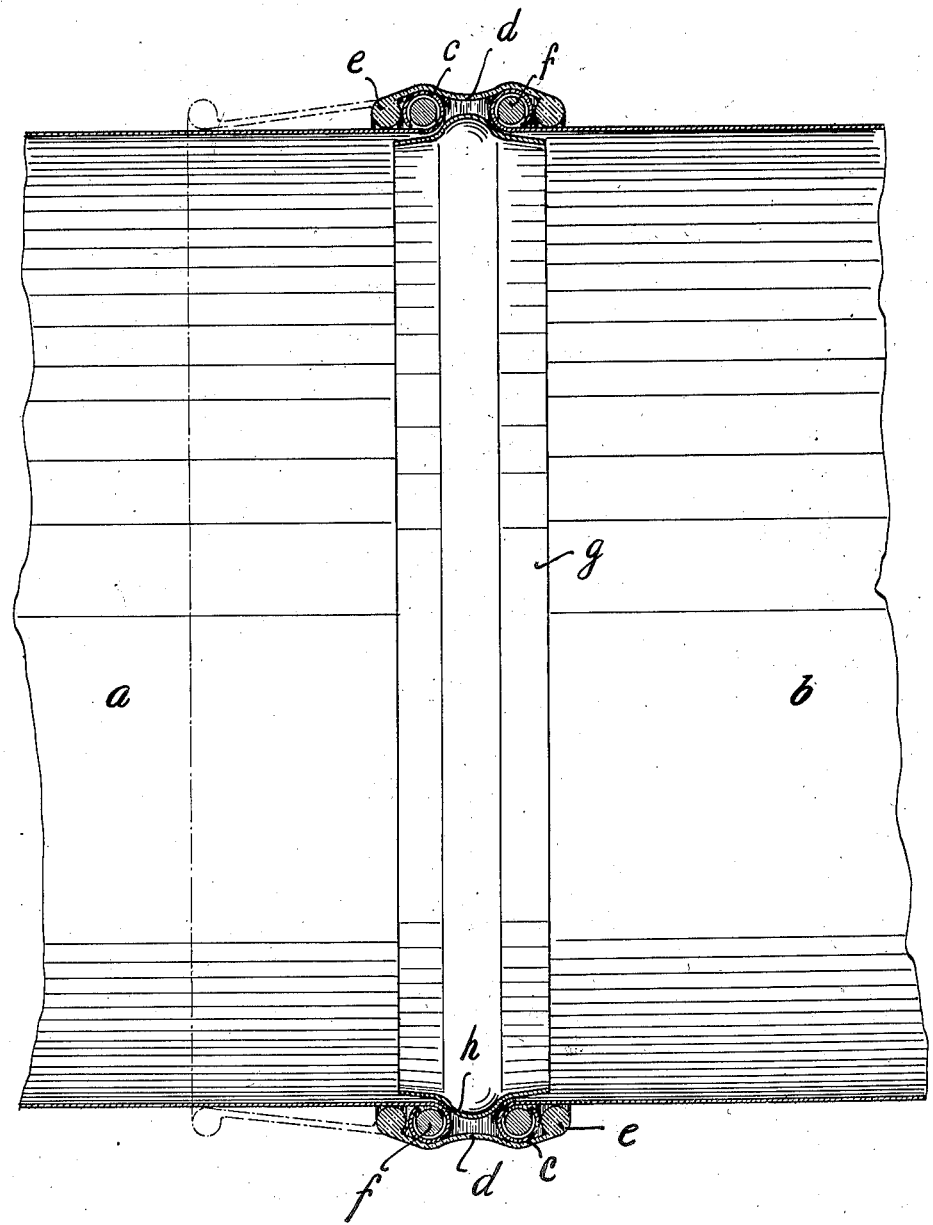

Patented Mar. 29, 1938

2,112,266

UNITED STATES PATENT OFFICE 2,112,266

ELASTIC PIPE CONNECTION FOR LOW TENSION WORKING PRESSURE OR VACCUM

Josef Brand, Duisburg-Hamborn, Germany

Application April 17, 1936, Serial No. 74,966
In Germany March 30, 1933

1 Claim. (Cl. 285—192)

Elastic rapid pipe connections for low tension working pressure by means of a sleeve of rubber extending over beads of the pipe ends are known. The wall of these sleeves is thick at the middle and reduced towards the ends, two annular grooves being provided on the inner side at the thickest point, the edge beads of the inserted pipe ends engaging in these grooves. The thick-walled sleeves are suitable only for the elastic connection of pipes of small diameter, as the pipes extend into the sleeve rather deeply. The thickened end edge of wide pipes, such as drains, cannot be forced into such sleeves, especially if the sleeve has to bear with tension on the pipe end. For higher working pressures elastic cups having edge beads are also used, the beads engaging behind the thickened ends of the pipes and packing the joint. In this instance no packing on the thickened portions of the pipes is effected. These cups serve merely as packing means, whereas the pipe connection proper is effected by clamp bands. These connections are also not suited for drains as they are not elastic enough. Metal sleeves of soft material, such as lead, are also used as pipe connections and solidly anchored on the pipe ends by means of tightened iron bands; they have at the middle an expansion zone. These movable pipe connections cannot serve as rapid pipe connections as special tools are required for these connections.

The invention relates to an elastic rapid pipe connection for low tension working pressure or vacuum, especially for drains, this connection consisting of a packing and connecting means constructed as an elastic cup.

According to the invention the cup, which in known manner has inner edge beads designed to grip behind collar- or flange-like thickenings of the pipe ends, is constructed so that it bears with tension on the pipe wall and on the outer circumference of the pipe thickening and elastically holds together the pipes axially and diametrically so that joints of the pipe parts are not pressed strongly the one against the other but can be moved away the one from the other or telescoped the one into the other and can be employed also in lines which are not straight, as often is the case under the ground. The rapid pipe connection is especially destined for drain pipes, the sheet metal wall of which is thin and in which the working fluid can act sucking or blowing. The elastic packing and connecting cup may be used also on drain pipes having flanges, a packing being then produced on the circumference of the flange as well as on the pipe wall, no separate fixation or tool being required and the drain pipes being securely held together axially and diametrically. The cup is very elastic and narrow so that it can be applied also on drain pipe joints which have suddenly become leaky. A slit ring may be preferably inserted, the tapered ends of which engage into the drain pipes to be connected. This is, however, usually not necessary.

An elastic rapid connection for drain pipes is shown in the only figure of the accompanying drawing in longitudinal section, the thickened portion of the drain pipe ends being formed by folding over, these pipe ends having a reinforcing insert.

The wall of the drain pipes $a$ and $b$ to be connected is thin. The ends of the drain pipes have each a thickening $c$ formed by beading over the pipe end. In each thickening $c$ a wire $f$ is inserted. The thickening may also be formed by welded on iron rods. The elastic packing and connecting cup $d$ of rubber has on the lower surface beads $e$ which at the application of the cup engage behind the thickened ends $c$ of the pipes. The application of cup $d$ is effected in such a manner that first one of the edge beads $e$ is placed over the thickened end $c$ of a drain pipe $a$. The remaining portion of the cup is then folded back on to the drain pipe $a$ (as indicated in dash-dot lines), whereupon $b$ is pushed on and the folded back portion of the cup placed over the thickened end of pipe $b$. The edge beads $e$ of the cup $d$ applied on to the pipe ends under tension, are hooked behind the thickened ends of pipes $a$ and $b$, the portion of the cup between the end beads $e$ being stretched over these thickened pipe ends and forming a second packing on the outer circumference of each thickening $c$ for each pipe end. In this manner the cup may be also employed for drain pipes with end flanges. In special cases, if a strong stressing of the joint in transverse direction is expected, a slit ring $g$ may be employed, the tapered ends of the ring extending into the two pipes. The ring $g$ has at the middle an outwardly projecting bead $h$.

I claim:—

An elastic pipe coupling for low pressure pipes with reinforced ends, especially for underground ventilation, comprising an elastic rubber sleeve with inwardly directed edge beads, said sleeve being narrow as compared to the diameter of the pipe and bearing with only small bearing surfaces on each pipe end to produce a double seal at each end by bearing with tension on the exterior of each pipe and on the outer periphery of the reinforced ends of the pipes, and a fitting ring inserted with play in the two pipe ends to prevent a transverse mutual displacement of the pipes.

JOSEF BRAND.